(No Model.) 2 Sheets—Sheet 1.
A. J. HARRIS.
DENTAL ENGINE HEAD.
No. 460,795. Patented Oct. 6, 1891.
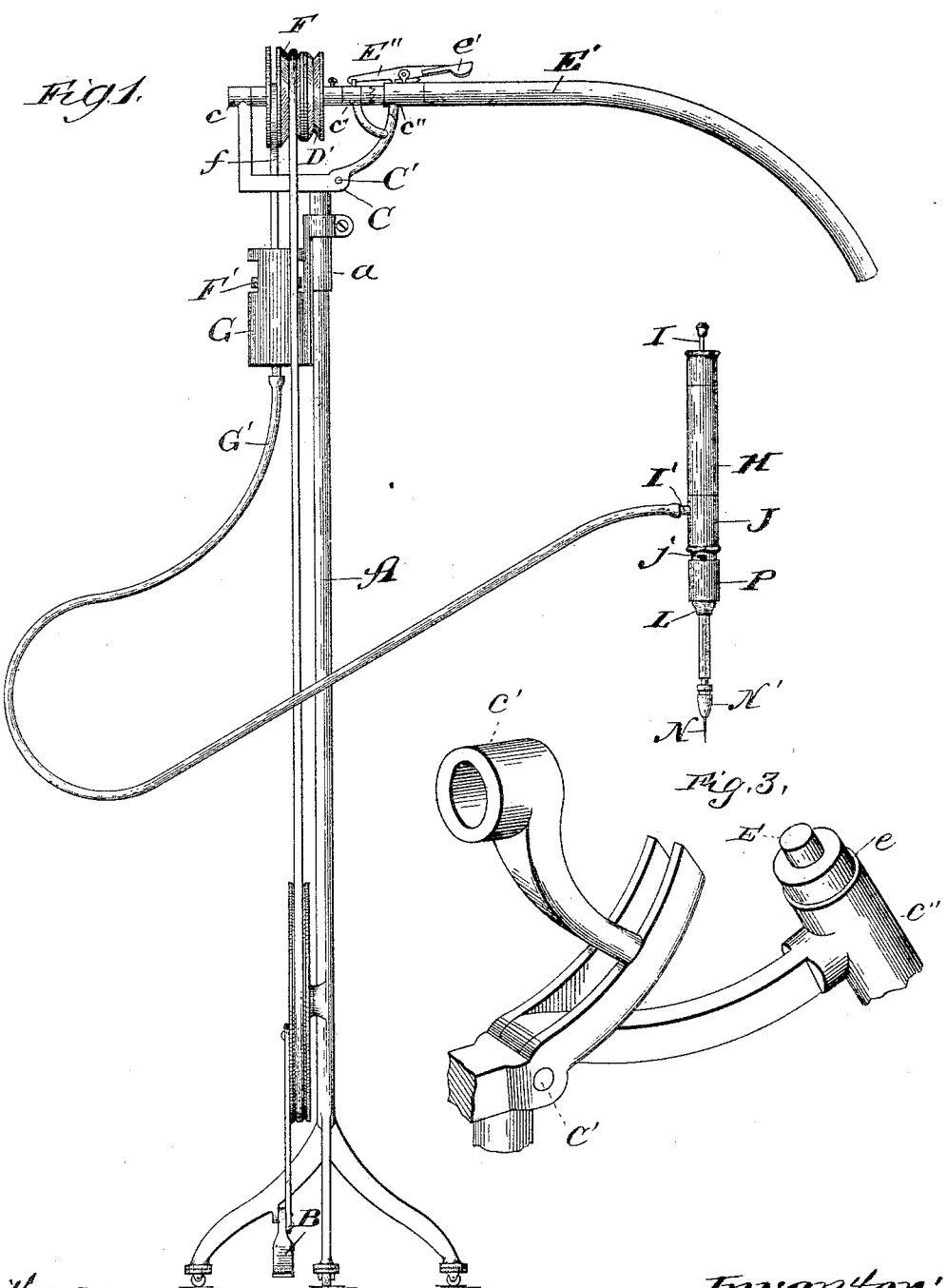

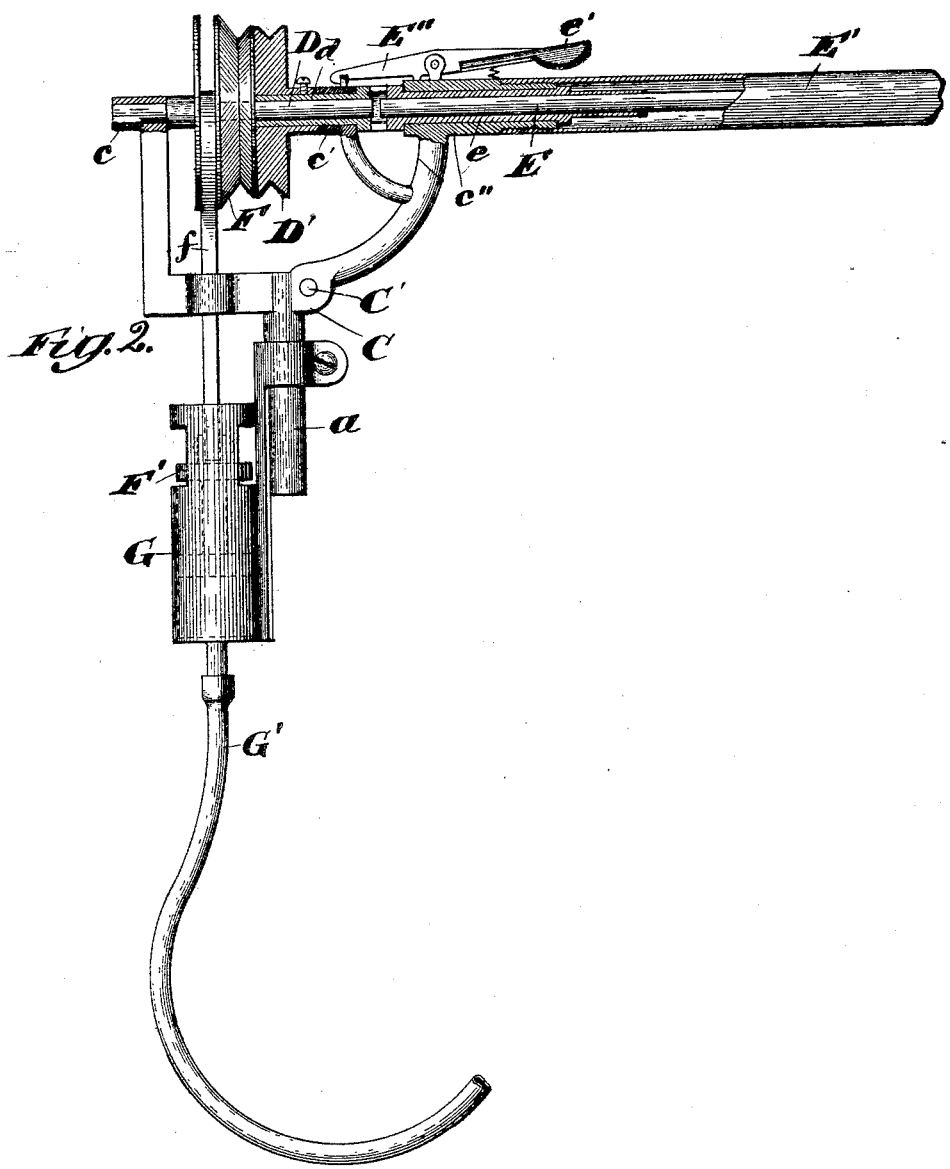

UNITED STATES PATENT OFFICE.

ANDREW J. HARRIS, OF CHICAGO, ILLINOIS.

DENTAL-ENGINE HEAD.

SPECIFICATION forming part of Letters Patent No. 460,795, dated October 6, 1891.

Application filed May 5, 1891. Serial No. 391,640. (No model.)

*To all whom it may concern:*

Be it known that I, ANDREW J. HARRIS, a citizen of the United States, residing at Chicago, Cook county, Illinois, have invented certain new and useful Improvements in Dental-Engine Heads, of which the following is a specification.

My invention consists in providing means in connection with the operating machinery whereby the same driving power can be utilized to operate either the drilling or plugging mechanism, the driving-belt being readily changed from its engagement with the drilling mechanism into engagement with the mallet-operating or plugging mechanism.

In the drawings, Figure 1 is a side elevation of a dental lathe or engine provided with my improved head connected with a mallet. Fig. 2 is a side elevation, partly in section, of the head of the machine shown in Fig. 1, the last two figures being upon an enlarged scale; and Fig. 3, a view of the shaft turned down by the side of the machine.

A stand A, provided with a treadle B, may be made in any desired form. To this stand I attach, as by means of a socket $a$, a frame or casting C, provided with bearings $c, c'$, and $c''$. A shaft D is supported at one end by the bearing $c$ and at the other end by the bearing $c'$, formed by a hollow shaft or sleeve $d$ fitting over it, and a pulley D' is secured to this hollow shaft, a journal being formed by one shaft fitting over the other, which permits transfer of power by shifting the belt from one pulley to the other.

The shaft E is connected with the ordinary drill, which in itself forms no part of my invention, and therefore requires no description. To this shaft is secured a sleeve $e$, which engages, by means of a suitable clutch, with the sleeve $d$, whereby the motion of the pulley D' is communicated to the shaft E. The bearing $c''$, in which revolve the sleeve $e$ and the shaft E, is hinged to the frame-work C at C' to allow the shaft E and the tube E', in which it is inclosed, to be turned down by the side of the standard when not in use in the well-known manner. To hold these parts in engagement when in operation I preferably provide a spring-catch E'', having a thumb-piece $e'$ and engaging with a lug on the bearing $c'$, the operation of these parts being obvious from the drawings.

On the shaft D is mounted another pulley F, to which is attached a piston-rod $f$, the other end of which is fastened to a double piston F', which travels up and down in a cylinder G, supported by means of the stand, to which it is attached in any suitable manner. The piston-rod $f$ is connected to an eccentric traveling on the shaft D and mounted, as shown, between the two disks of the pulley F, so that as the shaft revolves the piston and rod rise and fall. This piston is preferably made double in order to afford greater steadiness; but, if desired, may be made with a single head instead of being double. The lower end of this cylinder is connected by means of a pipe G', preferably made of rubber or other elastic material, with the mallet H.

The device having been constructed and put together as above described operates as follows: When the pulley D' is being driven by means of the belt, the drill will be operated through the connections already described. When it is desired to operate the hammer, the belt is shifted to the pulley F. As this pulley revolves, the piston-rod F' will be forced up and down in the cylinder G, forcing air through the tube to operate the hammer.

While I have described more or less specific forms, I do not intend to limit myself thereto, but contemplate the substitution of equivalents and changes in form and material whenever they may be necessary.

It will thus be seen that by the construction of the head or driving-machine I provide a simple and easy-operated means whereby the same driving power can be utilized either in connection with the drilling mechanism to operate the same or for the purpose of operating the pump used in connection with the plugging mechanism.

While in the drawing the shaft D is shown as extending through the hollow shaft $d$ to a point opposite the bearing $c'$, this is by no means essential, as the device may be constructed with the solid shaft extending only part way into the end of the sleeve. In this case the solid shaft would be supported at the left-hand end by the bearing $c$, the hollow shaft at the right-hand end by the bearing c', and the two shafts would interlock in the middle, the support for one end of the solid shaft being furnished by the bearing c and the other by the hollow sleeve.

I claim—

1. In a head for a dental engine, a shaft carrying a tight pulley and a loose pulley, one of the pulleys being connected with the drilling mechanism and the other with the plugging mechanism, substantially as described.

2. In a head for a dental engine, the combination of a solid shaft, a hollow shaft fitting over the solid shaft, a pulley mounted on one of the shafts, and a pulley and eccentric mounted on the other, whereby power may be transferred from the engine to the pump, and vice versa, substantially as described.

3. In a head for a dental engine, the combination of a shaft D, journaled in one or more suitable bearings, a pulley F and a hollow shaft d, loosely mounted on the shaft D, and a pulley D', rigidly secured to the hollow shaft, substantially as described.

4. In a head for a dental engine, the combination of shafts D and E, journaled in suitable bearings, a sleeve d, loosely mounted on shaft D, a pulley fastened to such sleeve, a sleeve rigidly secured to the shaft E, engaging with the sleeve d, and a spring-catch whereby the two sleeves are held in engagement, substantially as described.

5. The combination of a shaft D, a pulley mounted thereon, a piston-rod eccentrically pivoted to such pulley, a hollow shaft loosely mounted on the shaft D, and a pulley rigidly secured to such hollow shaft, substantially as described.

ANDREW J. HARRIS.

Witnesses:
EPHRAIM BANNING,
FRANK PARDEE.